United States Patent [19]

Nagaoka et al.

[11] Patent Number: 5,008,695
[45] Date of Patent: Apr. 16, 1991

[54] RANGEFINDER FOR CAMERA

[75] Inventors: Shinji Nagaoka; Koji Sato; Michio Kawai, all of Chiba, Japan

[73] Assignee: Seikosha Co., Ltd., Tokyo, Japan

[21] Appl. No.: 369,794

[22] Filed: Jun. 22, 1989

[30] Foreign Application Priority Data

Jun. 30, 1988 [JP] Japan ................................ 63-164441

[51] Int. Cl.[5] ........................ G03B 3/00; G01C 3/08
[52] U.S. Cl. ........................................ 354/403; 356/1
[58] Field of Search ........................ 354/403; 356/1, 4

[56] References Cited

U.S. PATENT DOCUMENTS 4,673,274 6/1987 Nagaoka et al. ................ 354/403
4,761,546 8/1988 Ikari et al. ...................... 356/1

Primary Examiner—W. B. Perkey
Attorney, Agent, or Firm—Jordan and Hamburg

[57] ABSTRACT

An active rangefinder for use in a camera. The rangefinder has a light-emitting device, a spot light position detector disposed at a given distance from the light-emitting device, head amplifiers, filters having amplification function, synchronous detectors, integrators, an adder, a subtracter, a microcomputer, and an automatic gain control (AGC). The filters are connected to their respective head amplifiers each having an operational amplifier. The gains of the filters are controlled by the AGC according to the output signals from the synchronous detectors.

14 Claims, 3 Drawing Sheets

RANGEFINDER FOR CAMERA

FIELD OF THE INVENTION

The present invention relates to a rangefinder that measures the distance to a subject by projecting light to the subject and detecting the position at which the reflected light is received.

BACKGROUND OF THE INVENTION

Cameras have used active rangefinders to measure the distance to a remote object. Specifically, a light-emitting device and a light-receiving device are disposed at a given interval. The light-emitting device projects light onto the subject. The reflected light falls on the light-receiving device as a light spot. The distance to the subject is calculated on the principle of triangulation.

In this kind of active rangefinder, the light reflected by the subject falls on the spot light position detector. The displacement of the position of the spot light from a reference point is transformed into two electric currents, which are then converted into corresponding voltage signals by current-to-voltage converter circuits. Subsequently, the ratio of the sum of these two voltage signals to the difference between them is calculated to find the distance.

The level of the output from the spot light position detector is in proportion to the distance of the spot light from the reference point. Also, the output level is proportional to the intensity of the incident extraneous light, i.e., the intensity of light coming from the whole subject. Therefore, if the brightness of the subject is high, head amplifiers acting also as current-to-voltage converters are saturated. This makes it impossible to measure the distance.

Accordingly, the gains of the head amplifiers are lowered to such extent that even if the brightness of the subject is high, the amplifiers are not saturated. Thus, the distance measurement can be made over a wide range of brightness. However, when an object of low brightness is photographed, the decrease in the gain is coupled with a reduction in the depth of focus of the camera lens. This results in a reduction in the focusing accuracy.

SUMMARY OF THE INVENTION

Accordingly, it is an object of the invention to provide an active rangefinder which is for use in a camera and capable of measuring distances with improved accuracy and without sacrificing its ability to measure distances to objects having high brightness.

The above object is achieved by controlling the levels of the signals from a spot light position detector according to the brightness of the subject. When the depth of focus is small, the distance is measured with high accuracy. When the brightness of the subject is high, the signals from the spot light position detector are attenuated to permit measurement of distance.

DETAILED DESCRIPTION OF THE INVENTION

Figure 1:
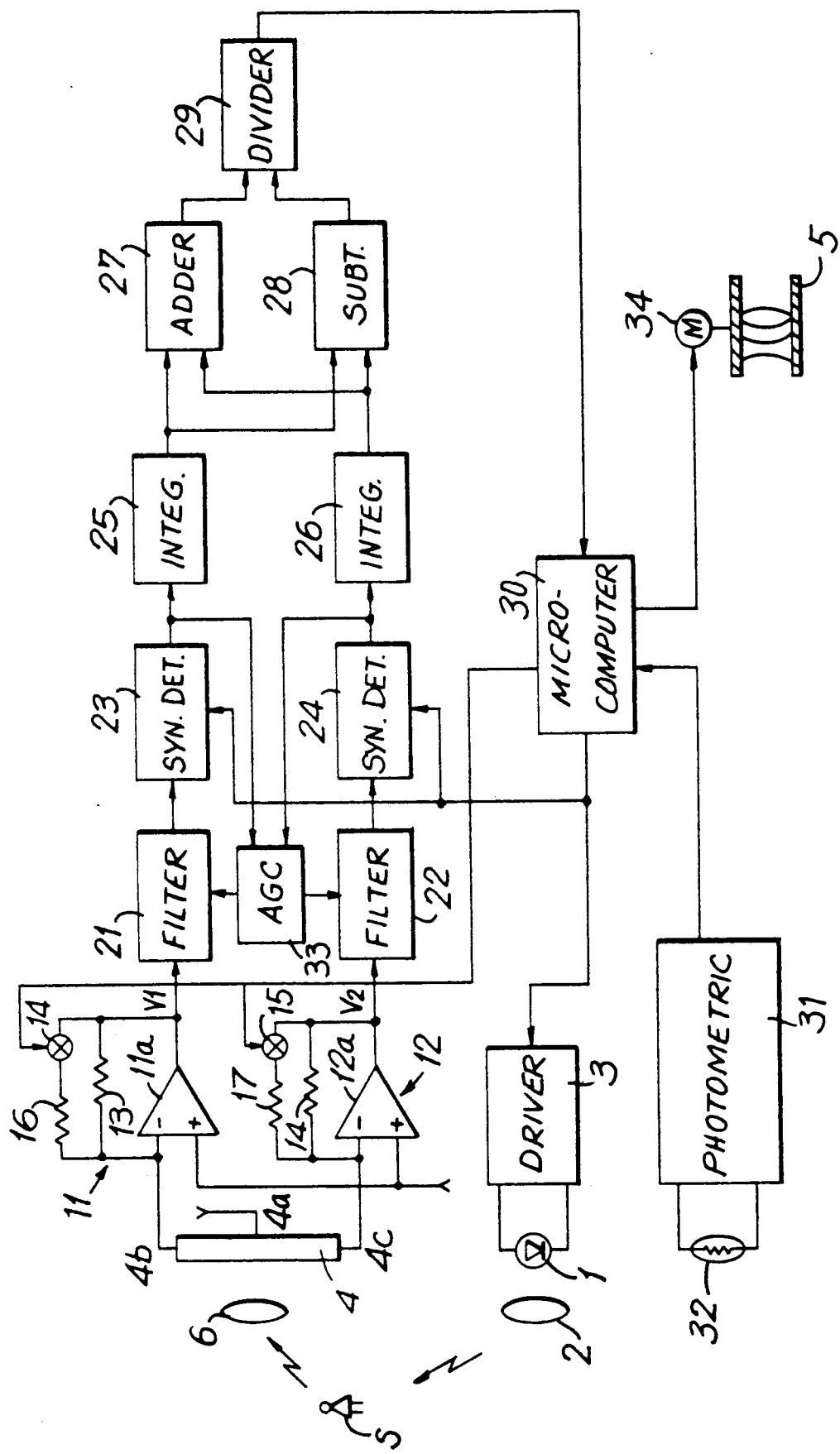
FIG. 1 is a block diagram of a rangefinder according to the invention.

Referring to FIG. 1, there is shown a rangefinder embodying the concept of the invention. A light-emitting device 1 emits light along the axis of a camera lens 5 via a condenser lens 2 to measure the distance to a subject. The light-emitting device 1 is caused to emit for a certain time by the output signal from a driver circuit 3 which is controlled by a microcomputer 30. Light coming along the optical axis of the lens 5 falls on a spot light position detector 4 at the focus of a condenser lens 6. The detector 4 has a cathode 4a and two anodes 4b and 4c, the cathode forming a common electrode. The anodes 4b and 4c deliver current signals at a ratio proportional to the distance of the light spot from the reference point.

Head amplifiers 11 and 12 receive signals from the anodes 4b and 4c, respectively, of the position detector 4. The amplifier 11 comprises a fixed resistor 13, an analog switching device 14, a feedback resistor 16, and an operational amplifier 11a. The feedback resistor 16 is connected with the operational amplifier 11a via the analog switching device 14. Similarly, the head amplifier 12 comprises a fixed resistor 14, an analog switching device 15, a feedback resistor 17, and an operational amplifier 12a. The feedback resistor 17 is connected with the operational amplifier 12a via the analog switching device 15. The analog switching devices 14 and 15 are controlled by the microcomputer 30. The output signals from the head amplifiers 11 and 12 are fed to synchronous detectors 23 and 24, respectively, via active bandpass filters 21 and 22, respectively. The voltage signals $V_1$ and $V_2$ flowing through these two channels, respectively, are integrated by integrators 25 and 26, respectively, which are connected to the detectors 23 and 24, respectively. An adder 27 is connected to the integrators 25 and 26 to produce the sum signal $(V_1+V_2)$. A subtracter 28 is connected to the integrators 25 and 26 to produce the difference signal $(V_1-V_2)$. A divider 29 is connected to the adder 27 and also to the subtracter 28 to produce the ratio or quotient signal $(V_1-V_2)/(V_1+V_2)$. A signal indicating the distance to the subject S is supplied to the microcomputer 30 from the divider 29.

The microcomputer 30 which controls all the operations of the camera drives the motor 34 according to the distance signal from the divider 29, for adjusting the focal length of the lens 5. Also, the microcomputer 30 controls the analog switching devices 14 and 15 according to the output signal from the photometric circuit 31 that measures the brightness of the subject, in the manner illustrated in a flowchart (described later).

A photoelectric converter 32 converts the brightness of the subject S into an electric signal. An automatic gain control (AGC) 33 controls the gains of the bandpass filters 21 and 22 according to the levels of the outputs from the synchronous detectors 23 and 24, respectively.

Figure 2:
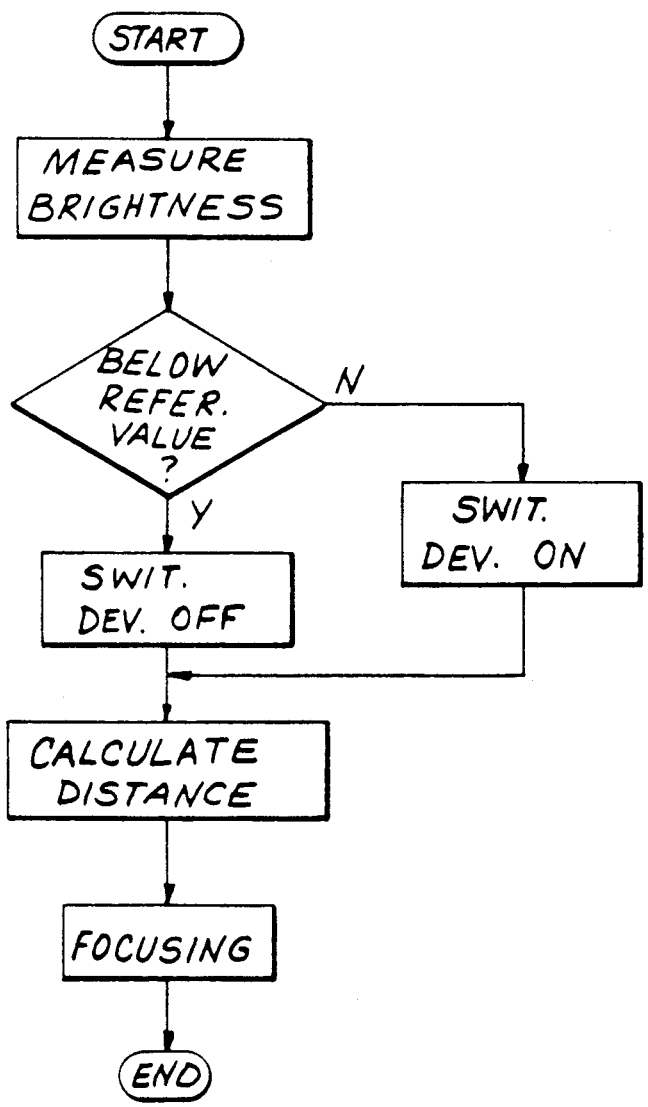
FIG. 2 is a flowchart illustrating the operation of the rangefinder shown in FIG. 1.

The operation of the rangefinder constructed as described above is now described by referring to the flowchart of FIG. 2. The power of the camera is turned on, and the shutter release is depressed to the first stop position. The output signal from the photometric circuit 31 which represents the brightness of the subject is compared with a reference value previously stored in the microcomputer 30. In the present example, the brightness of the subject is low. Therefore, the microcomputer 30 turns off the analog switching devices 14 and 15 to maintain the gains of the head amplifiers 11 and 12 at high levels.

The depression of the shutter release activates the driver circuit 3 to cause the light-emitting device 2 to emit light toward the subject S, for measuring the brightness. The light reflected from the subject S is focused by the condenser lens 6 into a spot light which falls on the spot light position detector 4. The ratio of the output currents appearing at the terminals 4b and 4c of the detector 4 is determined by the position of the incident light, or the distance of the spot light from the reference point. These current signals from the terminals 4b and 4c are converted into voltage signals by the head amplifiers 11 and 12, respectively, whose gains are set to high values. The voltage signals $V_1$ and $V_2$ are processed in a predetermined manner by the following stages to produce a signal proportional to the distance to the subject S.

When the brightness of the subject is high, the output signal from the photometric circuit 31 exceeds the reference value simultaneously with the depression of the shutter release. The microcomputer 30 turns on the analog switching devices 14 and 15 to lower the gains of the head amplifiers 11 and 12.

Although the output currents from the terminals 4b and 4c of the spot light position detector 4 are in proportion to the brightness of the subject and at high levels, the head amplifiers 11 and 12 will not be saturated but convert the current signals faithfully into the voltage signals $V_1$ and $V_2$.

Thus, the succeeding stages receive voltage signals which faithfully represent the distance to the subject S. Consequently, the arithmetic operation for calculating the distance is carried out precisely irrespective of the brightness of the subject. Depending on the degree of attenuation, the measuring accuracy may drop somewhat. Of course, since the brightness of the subject S is high, the lens is stopped down. This provides a great depth of focus. Therefore, in practice, the decrease in the measuring accuracy will present no problems.

In this example, the gains of the head amplifiers 11 and 12 are controlled. Obviously, the invention can be applied with similar utility to a rangefinder in which the gains of the head amplifiers 11 and 12 are set to such low levels that they are not saturated even for highly bright subjects, and in which the gains of the active bandpass filters 21 and 22 having an amplification function are controlled according to the brightness of the subject.

Figure 3:
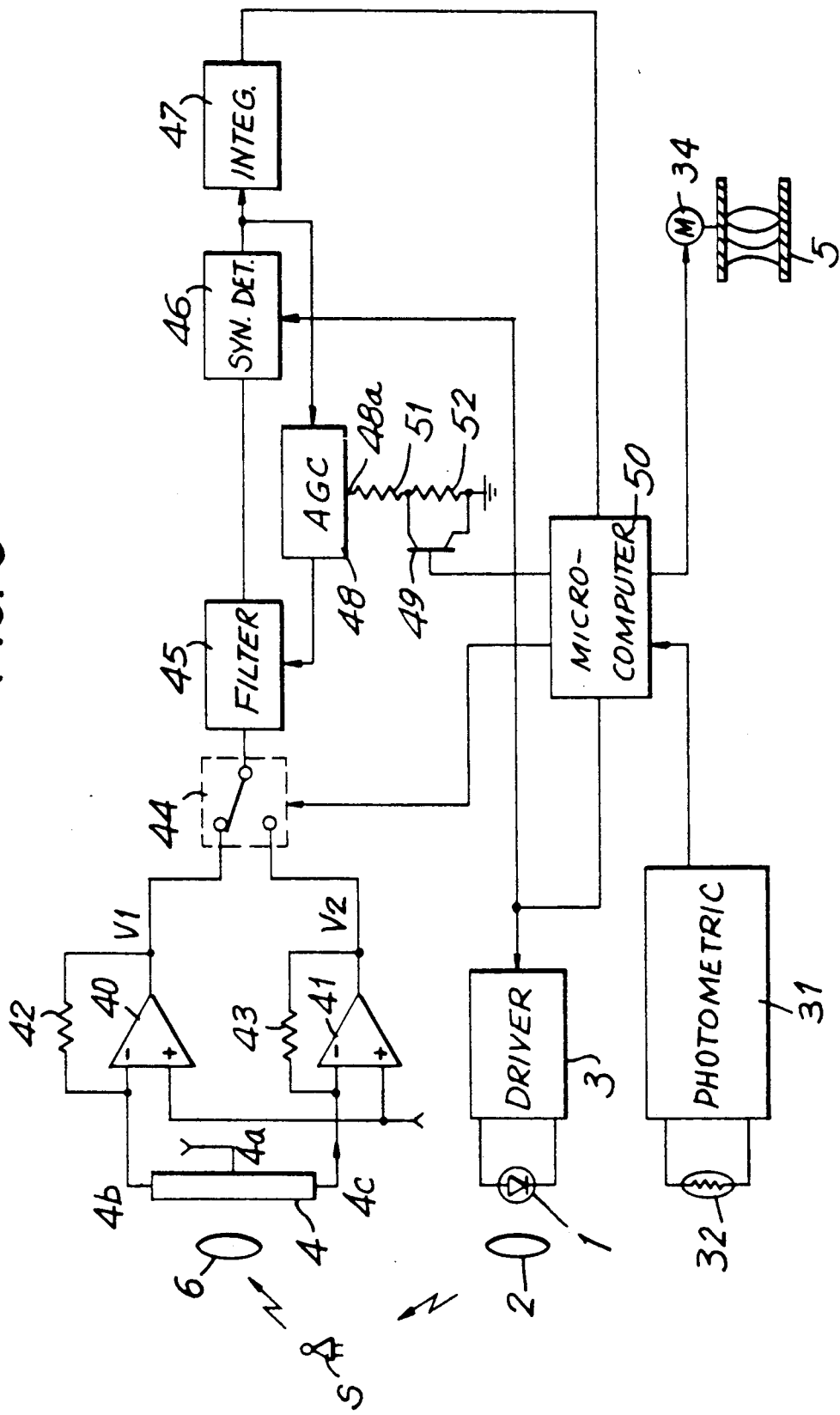
FIG. 3 is a block diagram of another rangefinder according to the invention.

Referring to FIG. 3, there is shown another rangefinder according to the invention. In this example, head amplifiers 40 and 41 receive current signals from terminals 4b and 4c, respectively, of a spot light position detector 4. The resistances of feedback resistors 42 and 43 are set to such values that the head amplifiers are not saturated even for very bright subjects. The output voltages $V_1$ and $V_2$ from the amplifiers 40 and 41, respectively, are alternately applied to a filter 45, a synchronous detector 46, and an integrator 47 via a signal selector 44. A microcomputer 50 calculates the distance from the output signal from the integrator 47. The output from the synchronous detector 46 is fed back to the active filter 45 having an amplification function via an automatic gain control (AGC) 48. This AGC 48 has a reference gain signal input terminal 48a to which reference resistors 51 and 52 are connected. A switching device 49 that is turned on and off by a signal supplied from the microcomputer 50 is inserted between the reference resistors 51 and 52.

In this example, when the shutter release is depressed to the first stop position, the photometric circuit 31 measures the brightness of the subject. When the brightness is high, the microcomputer 50 turns on the switching device 49 to lower the reference gain of the AGC 48. The current signals which are delivered from the terminals 4b and 4c of the spot light position detector 4 according to the distance to the subject S are converted into voltage signals by the head amplifiers 40 and 41 without causing saturation. These two signals are alternately applied to the following bandpass filter 45 by the signal selector 44. Obviously, the filter 45 delivers a voltage signal to the next stage without causing saturation, because the gain of the filter 45 is low. The voltage signal indicates the distance to the subject S. Then, the microcomputer 50 creates data about the distance.

When the brightness of the subject is low, the microcomputer 50 turns off the switching device 49 to reset the gain of the filter 45 to a higher value. Accordingly, where the distance to the subject S is large and the voltage signals from the head amplifiers 40 and 41 are low, the voltage signals are amplified to higher levels by the filter 45. Therefore, the signals are processed accurately at the following stages.

In this example, the gain of the active filter 45 is controlled. Similar advantages can be obtained by controlling the gains of the head amplifiers 40 and 41, as mentioned already.

In the above examples, the gains are controlled according to the signal from the photometric circuit 31. It is also possible to make use of the fact that the sum of the output currents flowing through the channels extending from the spot light position detector 4 is in proportion to the brightness of the subject. That is, the gains of the head amplifiers or the gain of the active bandpass filter is controlled according to the sum of the output currents from the spot light position detector. In this case, of course, similar advantages are offered.

As described thus far, in accordance with the present invention, the levels of the output signals from the spot light position detector are controlled according to the brightness of the subject. Therefore, where the brightness of the subject is low and the depth of focus is small, accurate measurement of distance is enabled. Where the brightness of the subject is high and the depth of focus is great, the measuring accuracy is lowered to prevent the distance from being measured incorrectly. The decrease in the accuracy is compensated for by an increase in the depth of focus. Hence, the reliability of all the focusing operation can be enhanced.

What is claimed is:

1. A rangefinder for use in a camera, comprising:
    (a) light-emitting means for emitting light toward a subject to be photographed;
    (b) spot light position detector means for producing an output current signal in response to said light reflected from said subject, said spot light position detector means being disposed at a given distance from the light-emitting means;
    (c) photometric means for measuring the brightness of said subject and incident extraneous light surrounding said subject, and for producing a brightness signal corresponding thereto; and
    (d) circuit means for producing an output distance signal corresponding to the distance of the camera from said subject, in response to said output current signal, said circuit means having an amplification function and including:
  (i) current-to-voltage converter means for converting the output current signal from the detector means into an output voltage signal;
  (ii) arithmetic means for arithmetically treating the output voltage signal from the current-to-voltage converter means to produce said output distance signal; and
  (iii) gain control means for varying the gain of said amplification function of said circuit means in accordance with said brightness signal.

2. A rangefinder according to claim 1, wherein said gain control means includes an automatic gain control circuit.

3. A rangefinder according to claim 1, wherein said current-to-voltage converter means includes at least one head amplifier.

4. A rangefinder for use in a camera, comprising:
  (a) light-emitting means for emitting light toward a subject to be photographed;
  (b) spot light position detector means for producing an output current signal in response to said light reflected from said subject, said spot light position detector means being disposed at a given distance from the light-emitting means; and
  (c) circuit means for producing an output distance signal corresponding to the distance of the camera from said subject, in response to said output current signal, said circuit means having an amplification function and including:
    (i) current-to-voltage converter means for converting the output current signal from the detector means into an output voltage signal, said current-to-voltage converter means including at least one head amplifier, each said head amplifier including an operational amplifier, a switchable feedback resistor connected in a first feedback path of said operational amplifier, a fixed resistor connected in a parallel second feedback path of said operational amplifier, and switching means connected in said first feedback path for selectively blocking said first feedback path;
    (ii) arithmetic means for arithmetically treating the output voltage signal from the current-to-voltage converter means to produce said output distance signal; and
    (iii) gain control means for varying the gain of said amplification function of said circuit means in accordance with the brightness of the subject.

5. A rangefinder according to claim 4, wherein said gain control means includes means for controlling said switching means to open and close said first feedback path.

6. A rangefinder according to claim 5, wherein said means for controlling turns said switching means off when the brightness of the subject is low and turns said switching means on when the brightness of the subject is high.

7. A rangefinder according to claim 4, wherein said means for controlling includes a microcomputer.

8. A rangefinder according to claim 1, wherein said circuit means further includes filter means for filtering said output voltage signal supplied to said arithmetic means.

9. A rangefinder for use in a camera, comprising:
  (a) light-emitting means for emitting light toward a subject to be photographed;
  (b) spot light position detector means for producing an output current signal in response to said light reflected from said subject, said spot light position detector means being disposed at a given distance from the light-emitting means; and
  (c) circuit means for producing an output distance signal corresponding to the distance of the camera from said subject, in response to said output current signal, said circuit means having an amplification function and including:
    (i) current-to-voltage converter means for converting the output current signal from the detector means into an output voltage signal;
    (ii) arithmetic means for arithmetically treating the output voltage signal from the current-to-voltage converter means to produce said output distance signal;
    (iii) filter means for filtering said output voltage signal supplied to said arithmetic means; and
    (iv) gain control means for varying the gain of said amplification function of said circuit means in accordance with the brightness of the subject, said gain control means being connected with said filter means for controlling the gain of said filter means.

10. A rangefinder according to claim 9, wherein said gain control means further includes means for controlling said gain control means in response to said distance signal.

11. A rangefinder according to claim 10, wherein said gain control means includes a reference gain signal input to which a reference gain signal is supplied, switching means for varying said reference gain signal supplied to said reference gain input, and means for controlling said switching means in response to the brightness of the subject.

12. A rangefinder according to claim 11, wherein said switching means includes a first and second resistor connected in series between said reference gain signal input and a reference potential, and semiconductor means supplied with said distance signal and connected with said first and second resistors for varying the reference gain signal supplied to said reference gain signal input in response to the brightness of the subject.

13. A rangefinder according to claim 12, wherein said semiconductor means is turned on when the brightness of the subject is high, so as to lower the gain of said gain control means.

14. A rangefinder according to claim 10, wherein said means for controlling includes a microcomputer.

* * * * *